United States Patent
Dold et al.

(10) Patent No.: US 9,997,898 B2
(45) Date of Patent: Jun. 12, 2018

(54) DISTRIBUTOR BLOCK WITH PHASE INDICATOR

(71) Applicant: Friedrich Goehringer Elektrotechnik GmbH

(72) Inventors: Ronald Dold, Schoenwald (DE); Friedbert Gerwin Bruetsch, Tuttlingen (DE)

(73) Assignee: Friedrich Goehringer Elektrotechnik GmbH, Triberg (DE)

( * ) Notice: Subject to any disclaimer, the term of this patent is extended or adjusted under 35 U.S.C. 154(b) by 0 days. days.

(21) Appl. No.: 15/263,682

(22) Filed: Sep. 13, 2016

(65) Prior Publication Data
US 2017/0133828 A1     May 11, 2017

(30) Foreign Application Priority Data
Oct. 1, 2015  (DE) ........................ 10 2015 116 717

(51) Int. Cl.
| | | |
|---|---|---|
| *H02G 3/08* | (2006.01) | |
| *G09F 3/20* | (2006.01) | |
| *H01R 9/24* | (2006.01) | |

(52) U.S. Cl.
CPC ............ *H02G 3/081* (2013.01); *G09F 3/205* (2013.01); *H02G 3/08* (2013.01); *H01R 9/24* (2013.01)

(58) Field of Classification Search
USPC ......................................... 40/642.02, 5, 495
See application file for complete search history.

(56) References Cited

U.S. PATENT DOCUMENTS

| | | | | |
|---|---|---|---|---|
| 2,774,158 | A * | 12/1956 | Tamoschat | A45D 33/18 116/317 |
| 2,842,877 | A * | 7/1958 | Stevens | A44B 15/005 116/318 |
| 7,414,329 | B2 * | 8/2008 | Cleveland | H02G 3/00 307/13 |
| 2007/0184721 | A1 * | 8/2007 | Ewing | H01R 25/006 439/620.26 |
| 2014/0132417 | A1 * | 5/2014 | Clark | H01H 9/281 340/654 |
| 2014/0262436 | A1 * | 9/2014 | Brazel | H02G 1/04 174/135 |
| 2015/0040447 | A1 * | 2/2015 | Ganster | G09F 3/0295 40/647 |
| 2017/0054226 | A1 * | 2/2017 | Eisert | H01R 4/30 |
| 2017/0133828 | A1 * | 5/2017 | Dold | H02G 3/08 |
| 2017/0141523 | A1 * | 5/2017 | Irons | G01R 21/00 |
| 2017/0155201 | A1 * | 6/2017 | Dold | H01R 9/2416 |

FOREIGN PATENT DOCUMENTS

| | | |
|---|---|---|
| DE | 10 2011 007 954 A1 | 7/2012 |
| DE | 10 2013 112 084 A1 | 5/2015 |

OTHER PUBLICATIONS

Wago Kontakttechnik GmbH & Co. KG: Catalogue of Terminal Systems 2009/2010. Minden, 2010: Seiten 394 und 395.—Company document.

* cited by examiner

*Primary Examiner* — Zachary M Pape
(74) *Attorney, Agent, or Firm* — William Gray Mitchell

(57) ABSTRACT

A distributor block for connecting several electric connection cables, starting from an electric input cable to an electrically isolating housing as well as an electrically conducting terminal block, which is arranged in the housing, with the distributor block comprising at least one display unit indicating the type of input cable.

19 Claims, 2 Drawing Sheets

DISTRIBUTOR BLOCK WITH PHASE INDICATOR

CROSS REFERENCE TO RELATED APPLICATIONS

This patent application claims priority to German Patent Application 10 2015 116 717.4, filed on Oct. 1, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a distributor block with a phase indicator.

Background of the Invention

Distributor blocks are known for connecting several electric connection cables, starting at an electric input cable with an electrically isolating housing as well as an electrically conductive terminal block arranged inside said housing. The input cable may represent a phase conductor (L1, L2, L3), a protective conductor (PE), or a zero conductor (N) for a three-phase current or a direct current conductor (DC) for a one-phase current. In prior art the type of the input cable is marked either by printing or by labeling the housing.

In distributor blocks of prior art it is considered disadvantageous that for each type of input cable a suitably marked housing must be used and that the relabeling of the housing is expensive.

The objective of the invention therefore comprises to provide a distributor block not showing these disadvantages.

This objective is attained in a distributor block showing the features as described herein.

BRIEF SUMMARY OF THE INVENTION

In a preferred embodiment, a distributor block for connecting several electric connection cables starting from an electric input cable with an electrically isolating housing as well as an electrically conductive terminal block, arranged in the housing, wherein the distributor block comprises at least one display unit, which shows a type of input cable.

In another preferred embodiment, the distributor block as described herein, wherein the display unit displays the type of the input cable in a manner visible for the human eye.

In another preferred embodiment, the distributor block as described herein, wherein the display unit comprises at least a first display which can display a phase of the input cable for a three-phase current.

In another preferred embodiment, the distributor block as described herein, wherein the first display is provided in a display area for each potential phase L1, L2 and L3 of the connected cable with a respective labeling.

A In another preferred embodiment, the distributor block as described herein, wherein the housing, particularly a cover of the housing, comprises a viewing window, particularly an opening, through which the labeling of the adjusted phase is visible.

In another preferred embodiment, the distributor block as described herein, wherein the first display is embodied in an adjustable fashion and cooperates with the viewing window of the housing such that the labeling of the phase of the input cable is visible through the viewing window.

In another preferred embodiment, the distributor block as described herein, wherein the first display is embodied in a sliding, rotational, or pivotal fashion.

In another preferred embodiment, the distributor block as described herein, wherein the first display can be held in reference to the housing by a latch arrangement in a plurality of settings, which is equivalent to the number of phases to be adjusted, particularly three.

In another preferred embodiment, the distributor block as described herein, wherein the latch arrangement comprises at least one recess for each setting, which cooperates with at least one latching cam.

In another preferred embodiment, the distributor block as described herein, wherein the first display comprises three recesses and the housing, particularly the cover, comprises a latching cam.

In another preferred embodiment, the distributor block as described herein, wherein the first display comprises a pin with an access opening for rotating the pin, with the housing comprising an opening through which the access opening can be operated.

In another preferred embodiment, the distributor block as described herein, wherein the first display comprises an element embodied as a sector connected to the pin and the labeling comprises the potential phases.

In another preferred embodiment, the distributor block as described herein, wherein the display unit comprises at least one colored display indicating with colors the type of connected cables and which may be arranged at the housing.

In another preferred embodiment, the distributor block as described herein, wherein the colored display is removable.

In another preferred embodiment, the distributor block as described herein, wherein the colored display and the housing are connected by a plug-in connection, perhaps a latching one.

In another preferred embodiment, the distributor block as described herein, wherein the colored display in the plugged-in condition covers at least the display area of the first display.

In another preferred embodiment, the distributor block as described herein, wherein the colored display comprises a first attachment which can be inserted into the opening of the housing for the pin of the first display.

In another preferred embodiment, the distributor block as described herein, wherein the colored display comprises a second attachment which can be inserted into the opening of the housing, through which the inscription of the first display is visible.

In another preferred embodiment, the distributor block as described herein, wherein the colored display is an essentially arc-shaped plaque.

In another preferred embodiment, the distributor block as described herein, wherein the colored display can be arranged at the cover, particularly at an edge of the cover.

In another preferred embodiment, the distributor block as described herein, wherein an area of the colored display amounts to at least 20%, preferably 30%, further preferred more than 50% of the area of the cover.

DETAILED DESCRIPTION OF THE INVENTION

Figures 1A, 1B:
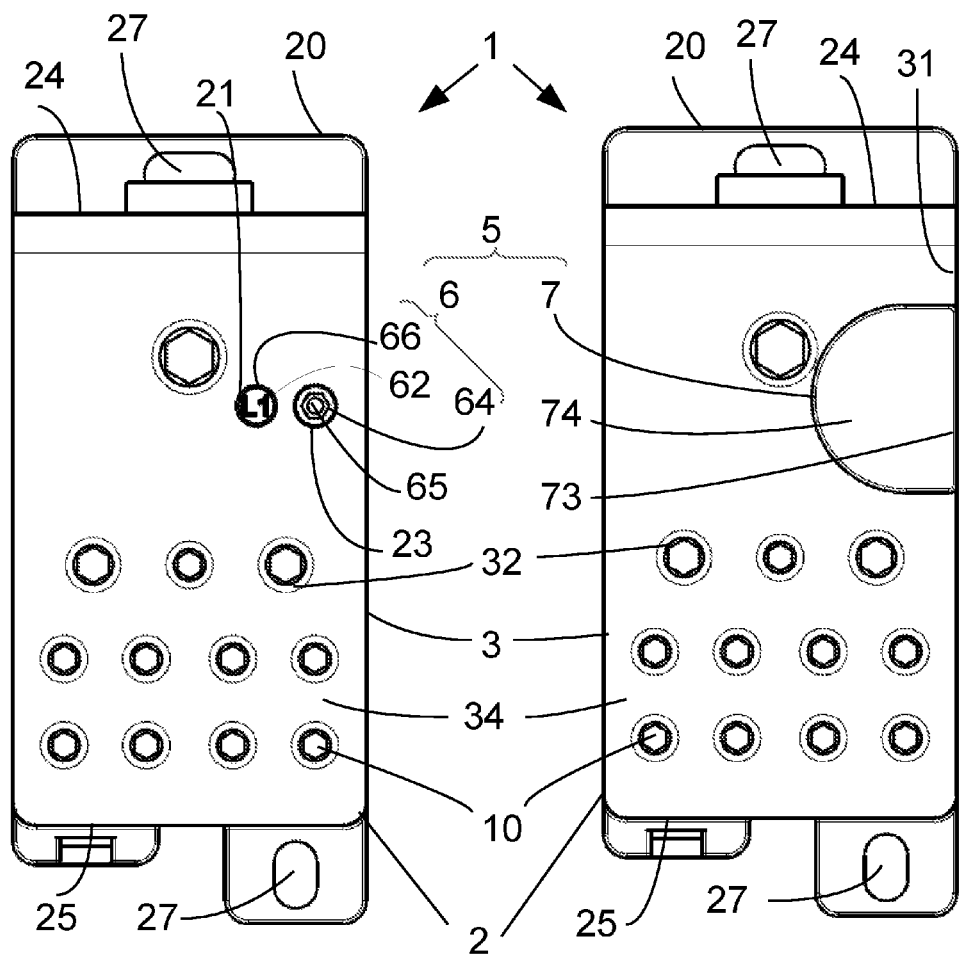
FIG. 1a is a line drawing evidencing a first exemplary embodiment of a distributor block in a view from the top.
FIG. 1b is a line drawing evidencing a second exemplary embodiment of a distributor block in a view from the top.

The distributor block according to the invention for connecting several electric connection cables, starting at an electric input cable, comprises an electrically isolating housing as well as an electrically conducting terminal block arranged inside the housing. Further, the distributor block comprises at least one display unit indicating a type of the input cable. In case of a three-phase current the type of input cable is understood to represent phase conductors (L1, L2, L3), protective conductors (PE), or zero conductors (N), and in case of a one-phase current to represent direct current conductors (DC). The phase conductors comprise, depending on the phase, three types of input cables L1, L2, and L3. With the display arrangement according to the invention the user and/or electrician can decide independently which allocation shall be used for the distributor block. If the user of the distributor block wants to use a different allocation, they need only adjust the display arrangement.

Advantageously the display arrangement shows the type of connected input cable in a form visible for the human eye. This is possible for example by coloring or signs arranged at the housing. This way the user can easily detect the type of input cable, which offers increased safety.

It is particularly advantageous for the display unit to show at least a first display which can indicate a phase of the input cable for a three-phase current, allowing the user to mark the phase L1, L2, or L3 of a phase cable with a single display unit. This way the user can change the labeling of the phase directly at the housing without using or exchanging additional components.

The first display may be provided in a display area for each of the possible phases L1, L2, L3 of the connection cable with a respective labeling. This offers very simple labeling options.

According to a particularly advantageous embodiment the housing, particularly a cover of the housing, comprises a viewing window, particularly an opening, through which the number of the phase set is visible. By adjusting the display here the respective phase can be shown in the viewing window such that a clear identification of the distributor block is possible in a simple fashion.

Preferably the first display is embodied in an adjustable fashion and cooperated with the viewing window of the housing such that the labeling of the phase of the input cable is visible through the viewing window. When the user adjusts the first display, here the phase of the input cable can be labeled at the housing itself and also relabeled. The distributor block can therefore be used in a flexible fashion, because it is only necessary to determine at the site of application for which phase conductor it is being used. This way the number of components to be provided for a user can remain limited and a manufacturer only needs to produce one product for all phase conductors.

The first display may be embodied in a displaceable, rotational, or pivotal fashion. This way a mechanism can be rendered in a very simple fashion for adjusting the display element and only a very easy motion is required for relabeling the cable.

It is particularly advantageous if the first display can be held in reference to the housing by a latch arrangement in a plurality of settings, equivalent to the number of phases to be adjusted, particularly three. This way, the risk of any undesired motion of the display is reduced and it is prevented that the display, for example, changes automatically based on vibrations. The arrangement this way provides increased safety for the user.

Due to the fact that the latch arrangement shows at least one recess per setting, which cooperates with at least one latching cam, the latch arrangement can be produced in a mechanically simple and therefore cost-effective fashion.

In particular, the first display may comprise three recesses and the housing, particularly the cover, may show a latching cam such that three defined positions can be yielded by a motion of the first display.

It is particularly advantageous for the first display to show a pin with an access opening for rotating the pin, with the housing comprising an opening through which the access opening can be actuated. This way the user can easily rotate the first display from the outside, for example using an Allen wrench, and thus change the display.

Preferably, the first display shows an element embodied as a sector, which is connected to the pin and shows the labeling of the potential phases. The sector is rotated with the pin such that the labeling visible through the viewing window can be changed.

According to a particularly advantageous embodiment the display unit comprises at least one colored display which indicates the type of the connection cable using colors and may be arranged at the housing such that the user can easily mark the type of cable and recognize it. In order to allow an electrician to detect them particularly easily the color of the colored display may be equivalent to the standardized color identifications of conductors: green-yellow for the protective conductor, and blue for the zero conductor.

Preferably the colored display is detachable so that the user, depending on the allocation of the distributor block, can quickly and easily exchange the colored display.

The colored display and the housing can be connected by a plug-in connection, perhaps a latching connection. This generates a simple and stable connection between the colored display and the housing, with the user also being able to remove and/or exchange the colored display without the use of any additional tools.

It is particularly advantageous for the colored display to cover at least the display area of the first display in the plugged-on condition. This generates a very space-saving and secure display unit. When the colored display is not arranged at the housing, labeling of the phase of a phase conductor is possible by the first display. This option would be utilized by an electrician when the input cable is a phase conductor. If now a different conductor than a phase conductor is used as the input cable the user can plug a respective colored display onto the first display such that the user always knows precisely and securely what type of input cable is used. This way all types of input cables can be identified.

Preferably the colored display shows a first attachment that can be inserted into the opening of the housing for the pin of the first display. This way a simple plug-in connection is generated between the housing and the colored display, with no other openings being required in the housing. For this purpose the attachment can prevent any rotary motion of the pin.

Additionally it is particularly advantageous for the colored display to show a second attachment that can be inserted into an opening of the housing, through which the labeling of the first display is visible. With the two attachments of the colored display a torque-proof connection of the colored display to the housing is generated.

The colored display can be essentially embodied as an arc-shaped plaque. This form is very simple in its production and can easily be handled by the user when inserting and removing it.

By allowing the colored display to be arranged at the cover, particularly an edge of said cover, here a simple alignment of the colored display is possible. For this purpose a manual removal of the colored display is very easy at the edge and can be supported by access openings, for example. This way a tool-free exchange is possible.

According to a particularly advantageous embodiment an area of the colored display amounts to at least 20%, preferably 30%, further preferred more than 50% of an area of the cover so that the colored display can be detected in a particularly easy fashion.

DETAILED DESCRIPTION OF THE FIGURES

FIG. 1a shows a first exemplary embodiment of a distributor block 1 in a view from the top. The distributor block 1 comprises a housing 2 with a housing body 20 and a cover 3, a terminal block 4 arranged in the housing 2 and not shown in greater detail in FIG. 1a, as well as a display unit 5, which is here embodied as a first display 6.

The housing body 20 is essentially embodied as a cuboid, and shows an inlet opening 26 at a first wall 24, not shown in greater detail in FIG. 1a, through which an inlet cable can be inserted, as well as a plurality of outlet openings at a second wall 25 opposite the first wall 24, through which the outlet cables can be inserted. For this purpose the housing body 20 shows an opening at an upper wall 28, abutting the first wall 24 and the second wall 25, through which the terminal block 4 can be inserted. The housing body 20 can be fastened by fixing means, particularly screws, at another fixed part. The fixing means can be inserted into holes 27, which are arranged at a lower side of the housing body 20. Additionally or alternatively here fastening means are also provided for arranging the distributor block 1 on a cap rail.

The cover 3 is essentially formed in an L-shaped fashion and comprises a first wall 33 and a second wall 34. The first wall 33 of the cover 3 covers in the closed state of the housing 2 the first wall 24 of the housing body 2 and shows an opening, not shown in greater detail, which forms with the inlet opening 26 of the housing body 2 an opening for the inlet cable. The second wall 34 of the cover 3 closes the opening 28 at the upper wall of the housing body 2 and shows a plurality of openings 32, in the present case twelve, through which the connection cables can be fixed by clamping means, in the present case clamping screws 10.

The first display 6 comprises a pin 64 as well as an element 66 with a display area 62. Labeling, particularly numbers for the potential phases L1, L2, and L3 of a phase conductor is provided on the display area 62. Through a viewing window 21, arranged at the second wall 34 of the cover 3, precisely this labeling is visible from the outside. The viewing window 21 is embodied as a circular opening in the present case and the diameter of the viewing window 21 is adjusted such that only one label is visible of the three potential phases of the display area 62 through the viewing window 21. This way the user can identify and detect the type of input cable, when the input cable is a phase conductor.

In addition to the viewing window 21, another opening 23 is arranged at the second wall 34 of the cover 3, through which the pin 64 of the first display 6 can be distorted at an access opening 65, preferably with an Allen wrench.

FIG. 1b shows a second exemplary embodiment of a distributor block 1 in a view from the top. The only difference to the exemplary embodiment of FIG. 1 is here that the display arrangement 5, as an alternative or in addition to the first display 6 of the first exemplary embodiment, shows a colored display 7.

The colored display 7 is essentially embodied as an arc-shaped plaque with an upper side 74 and a lower side 75 as well as a side 73 extending linearly and abutting the upper side 74 and the lower side 75. The colored display 7 is arranged on the second wall 34 of the cover 3 such that the upper side 74 is visible from the outside, namely at an edge 31 of the second wall 34, which is aligned to the linearly extending edge 73 of the colored display 7. However, the colored display 7 is not connected fixed to the cover 3 but detachable therefrom.

An area of the colored display 7 is selected such that it meets the standard IEC60757 and thus is easily recognized by the user. Here, an area ratio is advantageous between the area of the colored display and an area of the second wall 34 of the cover 3 amounting to 30%. An area ratio of at least 20% is also possible, preferably more than 50%.

In the present case, the colored display 7 covers the viewing window 21 and the opening 23 of the second wall 34 of the cover 3, and thus the first display 6 of the distributor block 1 of FIG. 1a. However, it is also possible that the display unit 5 only shows the first display 6 or only the colored display 7.

Figures 2A, 2B:
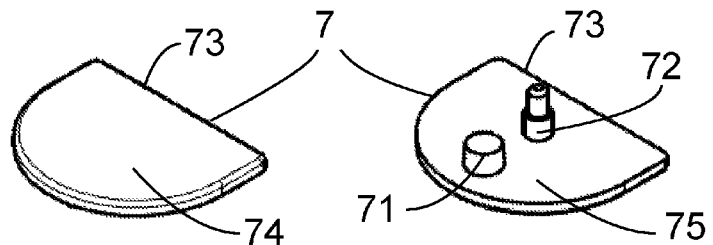
FIG. 2a is a line drawing evidencing a colored display of FIG. 1b in a perspective view from the top.
FIG. 2b is a line drawing evidencing a colored display of FIG. 1b in a perspective view from the rear.

FIGS. 2a and 2b show the colored display of FIG. 1b in a perspective view from the top (FIG. 2a) and from the bottom (FIG. 2b).

The upper side 74 of the colored display 7 comprises one or more colors, which indicate the type of input cable. In particular, the colored display 7 may identify either a protective conductor, for example with the color green-yellow, or a zero conductor, for example with the color blue, for a three-phase alternating current, or a direct current conductor, e.g. with the color red.

The lower side 73 of the colored display 7 comprises two attachments 71 and 72. The first attachment 71 is embodied in a cylindrical fashion and is therefore suitable to be inserted into the opening 21 of the cover 3 for the element 66 of the first display 6. The second attachment 72 comprises a first cylindrical section, with a second cylinder, showing a diameter smaller than a diameter of the first cylinder being arranged thereat. The attachment 72 is suitable for being inserted into the opening 23 of the cover 3 for the pin 64 of the first display 6. In particular, the second cylinder of the attachment 72 is suitable to be inserted into the access opening 65 of the first display 6 in order to prevent any motion of the pin 64. This way, the attachments 71, 72 of the colored display 7 with the openings 21, 23 of the cover 3 form a plug-in connection, perhaps a latching connection. The latching can be formed for example by a respective embodiment of the diameters of the attachments as well as appropriate diameters of the openings. This way it is prevented that the second display is loosened too easily from the housing and it is ensured that the display is not removed unintentionally.

Due to the fact that the colored display 7 is removable, then either the phase of the phase conductor can be characterized by the first display 6 when the colored display 7 is not arranged at the cover 3, or a protective conductor, a zero conductor, or a direct current conductor can be characterized by the colored display 7 when the colored display 7 is arranged at the cover 3. The electrician can therefore select the type of labeling depending on the type of input cable.

Figure 3:
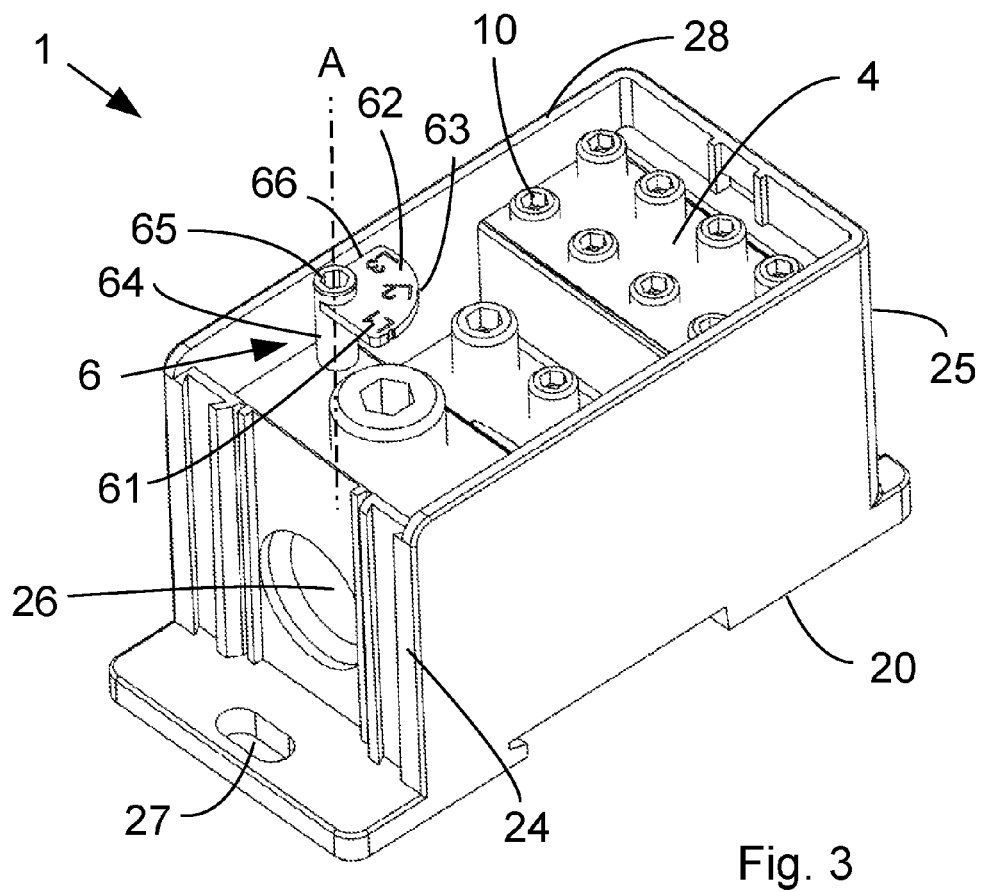
FIG. 3 is a line drawing evidencing a perspective view of the distributor block of FIG. 1a without a cover.
Figure 4:
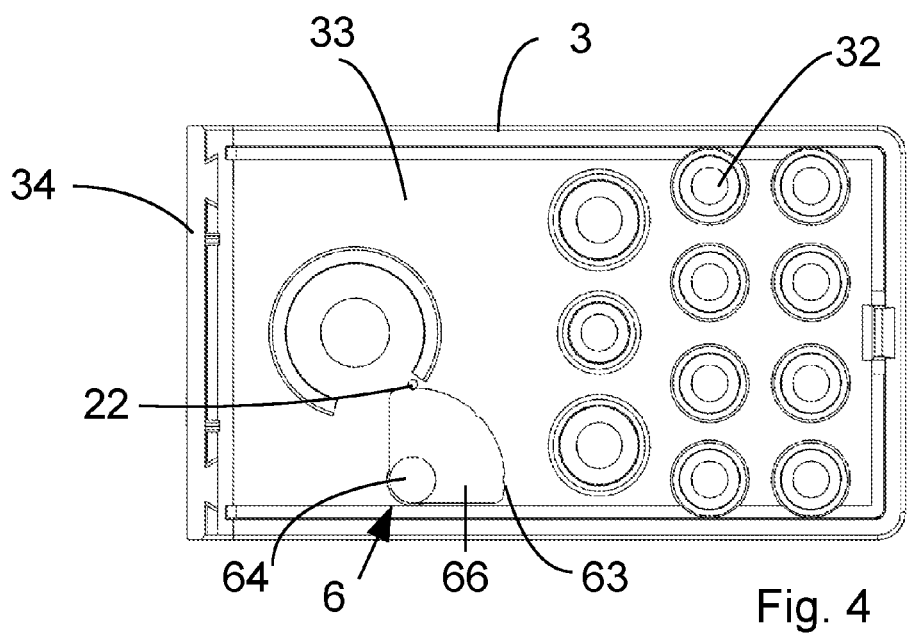
FIG. 4 is a line drawing evidencing the cover and the first display of the distributor block of FIG. 1a in a view from the bottom.

FIG. 3 shows a perspective view of the distributor block 1 of FIG. 1a without a cover 3. FIG. 4 shows the cover 3 and the first display 6 of the distributor block 1 of FIG. 1a in a view from the bottom. Both figures show in greater detail the first display 6 as well as its arrangement in the housing body 20 and in the cover 3.

FIG. 3 shows the terminal block 4 in a particularly clear fashion. The terminal block 4 is arranged in the housing body 20. The terminal block 4 comprises an input opening, now shown in greater detail, for the input cable, which overlaps the input opening 26 of the housing body 20, outlet openings not shown in greater detail for the connection cables, which overlap respectively with output openings of the housing body 20, as well as openings for the clamping screws 10, not shown in greater detail, which respectively overlap one of the openings 32 of the cover 3.

As already explained, the first display 6 comprises a pin 64 with an access opening 65, through which the first display 6 can be rotated about an axis A as well as an element 66 with a display area 62. The element 66 is embodied as a sector which is arranged in a level extending perpendicular in reference to the axis A. The sector is divided into three equally shaped partial sectors, with respective markings and/or labels 61 of the phases L1, L2, L3 being applied thereat, forming the display area 62. Each partial sector comprises an edge line of a recess 63. These recesses 63 cooperate with a latching cam 22 which is arranged at an interior of the second wall 34 of the cover 3, which is particularly clearly shown in FIG. 4. This way, with the recesses 63 of the first display 6 the latching cam 22 of the cover 3 forms a latching arrangement with three different settings. The settings of the first display 6, and thus the visible inscription of the display area 62 visible through the viewing window 21 of the cover 3, can be changed by rotating the pin 64 preferably with an Allen wrench in the access opening 65.

Other movements of the first display 6 are also possible. The first display 6 can be pivotal or can be displaceable, for example.

This way, the electrician can select any labeling of the phase of the input cable as necessary. If here the input cable is not a phase conductor but a zero conductor, a protective conductor, or a direct current conductor, the electrician can cover the first display 6 with the appropriate colored display such that labeling the type of input cable is easily possible.

LIST OF REFERENCE NUMBERS

1 Distributor block
2 Housing
3 Cover
4 Terminal block
5 Display unit
6 First display
7 Colored display
10 Clamping screw
20 Housing body
21 Viewing window
22 Latching cam
23 Opening
24 First wall
25 Second wall
26 Inlet opening
27 Hole
28 Opening
31 Edge
32 Opening
33 First wall
34 Second wall
61 Labeling
62 Display area
63 Recess
64 Pin
65 Access opening
66 Element
71 Attachment
72 Attachment
73 Linearly extending edge
74 Upper side
75 Lower side
A Axis The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A distributor block for connecting several electric connection cables starting from an electric input cable with an electrically isolating housing as well as an electrically conductive terminal block, arranged in the housing, wherein the distributor block comprises at least one display unit, which shows a type of input cable, wherein the display unit comprises at least a first display which can display a phase of the input cable for a three-phase current and wherein the first display comprises a pin with an access opening for rotating the pin, with the housing comprising an opening through which the access opening can be operated.

2. The distributor block according to claim 1, wherein the display unit displays the type of the input cable in a manner visible for the human eye.

3. The distributor block according to claim 1, wherein the first display is provided in a display area for each potential phase L1, L2 and L3 of the connected cable with a respective labeling.

4. The distributor block according to claim 1, wherein the housing, particularly a cover of the housing, comprises a viewing window, particularly an opening, through which the labeling of the adjusted phase is visible.

5. The distributor block according to claim 4, wherein the first display is embodied in an adjustable fashion and cooperates with the viewing window of the housing such that the labeling of the phase of the input cable is visible through the viewing window.

6. The distributor block according to claim 5, wherein the first display is embodied in a sliding, rotational, or pivotal fashion.

7. The distributor block according to claim 1, wherein the first display can be held in reference to the housing by a latch arrangement in a plurality of settings, which is equivalent to the number of phases to be adjusted, particularly three.

8. The distributor block according to claim 7, wherein the latch arrangement comprises at least one recess for each setting, which cooperates with at least one latching cam.

9. The distributor block according to claim 8, wherein the first display comprises three recesses and the cover of the housing comprises the latching cam.

10. The distributor block according to claim 1, wherein the first display comprises an element embodied as a sector connected to the pin and the labeling comprises the potential phases.

11. The distributor block according to claim 1, wherein the display unit comprises at least one colored display indicating with colors the type of connected cables and which may be arranged at the housing.

12. The distributor block according to claim 11, wherein the colored display is removable.

13. The distributor block according claim 12, wherein an area of the colored display amounts to at least 20% of an area of the cover.

14. The distributor block according to claim 11, wherein the colored display and the housing are connected by a latching plug-in connection.

15. The distributor block according to claim 11, wherein the colored display in the plugged-in condition covers at least the display area of the first display.

16. The distributor block according to claim 11, wherein the colored display comprises a first attachment which can be inserted into the opening of the housing for the pin of the first display.

17. The distributor block according to claim 11, wherein the colored display comprises a second attachment which can be inserted into the opening of the housing, through which the inscription of the first display is visible.

18. The distributor block according to claim 11, wherein the colored display is an arc-shaped plaque.

19. The distributor block according to claim 11, wherein the colored display can be arranged at an edge of a cover.

* * * * *